Feb. 12, 1929.
A. W. NIKANDER
MOLDING
Filed June 13, 1925
1,701,794
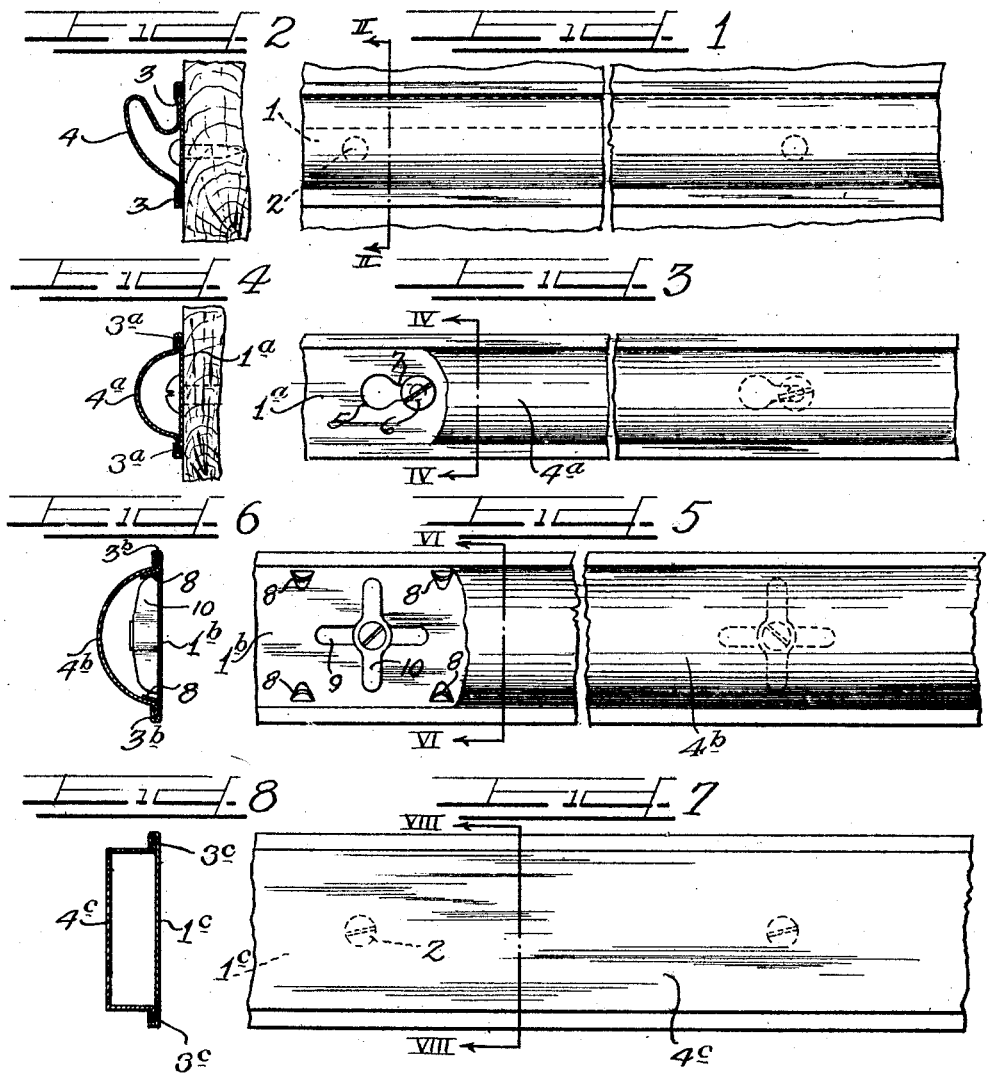
Inventor
August W. Nikander
by Charles W. Hills
Attys Patented Feb. 12, 1929.

1,701,794

UNITED STATES PATENT OFFICE.

AUGUST W. NIKANDER, OF DETROIT, MICHIGAN.

MOLDING.

Application filed June 13, 1925. Serial No. 36,863.

This invention relates to moldings in general and more particularly to outside moldings of the type adapted for use on automobile bodies.

It is an object of this invention to provide a molding of neat appearance which is rugged and may be simply and economically manufactured.

It is further an object of this invention to provide a molding which may be simply and easily applied to an automobile body or the like.

It is also an important object of this invention to provide a molding which may be readily and efficiently attached.

Other and further important objects of this invention will be apparent from the disclosures in the specification and the accompanying drawings.

This invention (in a preferred form) is illustrated in the drawings and hereinafter more fully described.

On the drawings:

Figure 1 represents a fragmentary elevational longitudinal view of a molding embodying this invention.

Figure 2 is a sectional view at the line II—II of Figure 1.

Figure 3 is a fragmentary longitudinal elevational view of a modified form of this invention.

Figure 4 is a sectional view at the line IV—IV of Figure 3.

Figure 5 is a fragmentary longitudinal elevational view of a further modified form of this invention.

Figure 6 is a sectional view at the line VI—VI of Figure 5.

Figure 7 is a fragmentary longitudinal elevational view of another modified form of this invention.

Figure 8 is a sectional view at the line VIII—VIII of Figure 7.

As shown on the drawings:

Referring to Figure 1 numeral 1 represents a longitudinal metallic base strip which extends along the part to be covered and which is secured to said part by means of screws 2. The longitudinal edges of the strip 1 are flanged inwardly to form grooves 3 or guides for receiving in said grooves the longitudinal edges of an outer strip 4 which is hollow, the contour thereof forming a drip molding. The contour of the outer strip 4 may be varied as shown in Figures 4, 6 and 8.

In Figures 3 and 4 the inner strip here designated as 1ª is provided with an aperture 5 of sufficient diameter to receive therethrough the heads of bolts 6. The bolts 6 are not secured all the way into the part to be covered, the heads being spaced away from said part an amount approximately equal to the thickness of the strip 1ª. Each aperture 5 thus forms a key-way slot with its respective slot 7. A slot 7 is provided which merges with the aperture 5. The strip 1ª is adapted to be placed over the bolts 6, the heads of the latter extending through the apertures 5. When the strip 1ª is then moved longitudinally, the bolts 6 will enter the slots 7, the heads of said bolts engaging the strip 1ª adjacent the edges of said slots.

In Figures 5 and 6 the inner strip here designated as 1ᵇ is shown provided with upwardly struck tangs or braces 8 which are adapted to brace the outer strip 4ᵇ against removal from the grooves 3ᵇ. The strip 1ᵇ is apertured as at 9 to receive therethrough a wing nut 10 which after entering said aperture is adapted to be turned to the position shown for securing said strip to the part to be covered.

It will be evident that after the inner strip 1 (1ª, 1ᵇ, or 1ᶜ) has been secured as desired over the part to be covered, the outer strip 4 (4ª, 4ᵇ or 4ᶜ) may then be slid into position in the grooves 3 (3ª, 3ᵇ or 3ᶜ) and suitably secured therein.

It will be obvious to those skilled in the art that I have provided a simple, rugged and efficient molding which may be economically constructed and attached.

It will also be obvious that the tangs 8 may be provided in each modification shown to brace the outer strip thereof.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. In a molding, a base strip having flanged edges defining guides, an outer strip having edges complemental to said guides and slidable in said guides, and tangs struck from said base strip engaging said outer strip and limiting transverse movement of the same.

2. In a molding, a base strip having integral flanged edges defining grooves, a molding member having edges slidable in said grooves, and spurs integral with said base member and adapted to press and retain said molding member in positive engagement with said grooves.

3. A molding comprising a base strip having flanged edges defining grooves, an outer strip having edges engageable in said grooves, and means struck from said base strip for retaining said outer strip in engagement with said base strip, said means being enclosed by said outer strip.

In testimony whereof I have hereunto subscribed my name.

AUGUST W. NIKANDER.